United States Patent [19]

Ingram

[11] 4,156,864
[45] May 29, 1979

[54] PRESSURE SWITCH CHECKING DEVICE FOR LOCOMOTIVES

[75] Inventor: Albert V. Ingram, Caddo Parish, La.

[73] Assignee: The Kansas City Southern Railway Co., Inc., Kansas City, Mo.

[21] Appl. No.: 880,182

[22] Filed: Feb. 22, 1978

[51] Int. Cl.² ............................................. G08B 21/00
[52] U.S. Cl. .................................. 340/52 C; 340/514; 340/611; 307/118; 73/39
[58] Field of Search ............... 340/500, 514, 515, 540, 340/603, 605, 606, 611, 614, 626, 52 B, 52 C; 307/118; 73/39

[56] References Cited
U.S. PATENT DOCUMENTS 4,025,781  5/1977  Brearley ............................. 340/52 C Primary Examiner—Alvin H. Waring
Attorney, Agent, or Firm—Lowe, Kokjer, Kircher, Wharton & Bowman

[57] ABSTRACT

A device which facilitates the testing of pressure switches included in the brake systems of locomotives. An air line is tapped into the pressure line of each switch and is provided with a quick connect coupling conveniently located on a test panel. Another quick connect coupling on the panel connects with the main air reservoir of the brake system. Also located on the test panel adjacent to the respective couplings are pairs of electrical receptacles for each switch. The receptacles connect with electrical conductors which lead to opposite sides of each switch contact. A preselected test pressure may be applied to each switch by connecting an air hose equipped with an adjustable reducing valve and pressure gauge between the main air reservoir coupling and the coupling for the switch to be tested. An ohmmeter may be connected across the receptacles for the switch contact under test to indicate whether the switch contact is open or closed at the test pressure.

5 Claims, 3 Drawing Figures

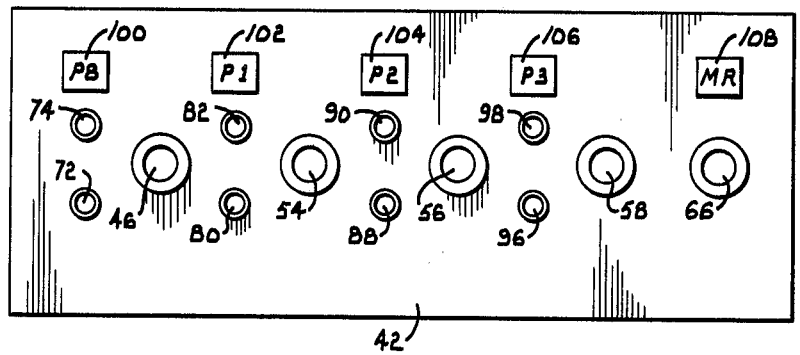
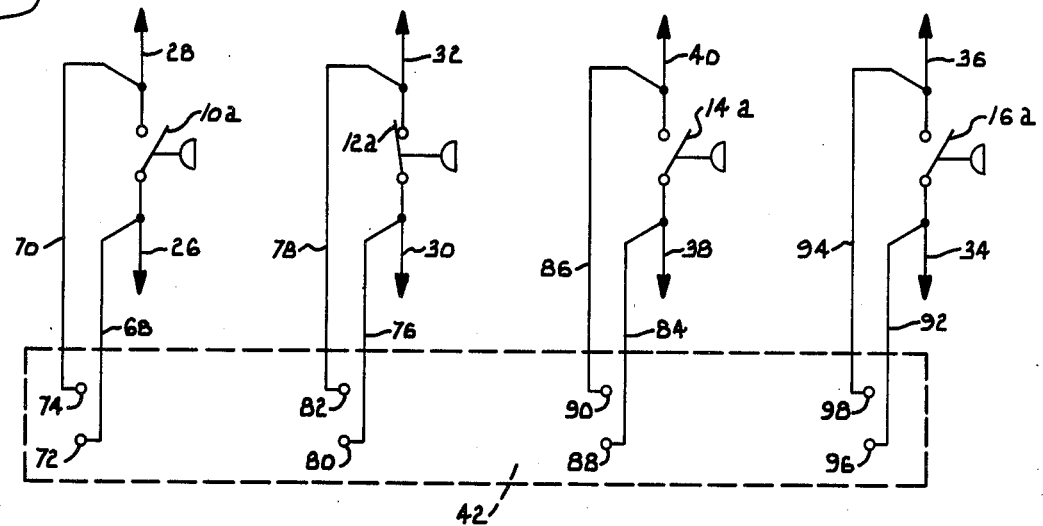
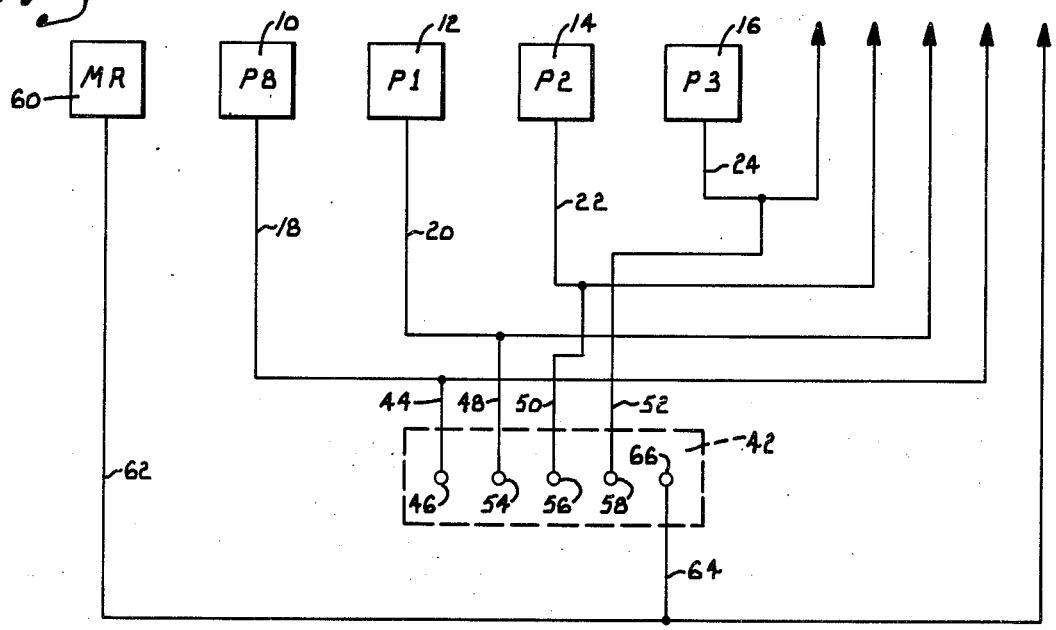

PRESSURE SWITCH CHECKING DEVICE FOR LOCOMOTIVES

BACKGROUND AND SUMMARY OF THE INVENTION

This invention relates to an improved checking device that is used to test the pressure switches on the air brake manifolds of locomotives.

The air brake manifolds of locomotives are provided with a series of pressure sensitive switches that perform a variety of functions in connection with sensing the air pressure in the brake lines. For example, with locomotives having a lead or master unit and a remote or slave unit that is radio controlled in accordance with the operation of the master unit, the pressure switches assure that the braking of the remote unit conforms with that of the master unit. If the pressure switches are not adjusted correctly, the brakes will not work properly at either the master or remote position.

These pressure switches must be frequently checked to determine that they are operating properly. At present, testing of the switches requires removal of a cover plate so that an ohmmeter can be connected across the switch terminals to sense whether or not the switch is opening and closing properly. Also, the fitting for the air line leading to the switch must be disconnected and replaced by a male adapter. A main reservoir line is then tapped, and a hose equipped with a pressure gauge and pressure reducing valve is connected between the main reservoir line and the male adapter. The reducing valve is adjusted to the proper test pressure which is to be applied to the switch in order to ascertain whether or not it is opening and closing as intended. If adjustment of the switch is needed, a cover plate is removed from the front of pressure switch and an adjustment screw is turned in the appropriate direction. After the test, the ohmmeter must be disconnected and the cover plate replaced, and the male adapter must be removed and replaced by the fitting for the air line.

As can be easily appreicated, this present testing procedure is difficult, cumbersome, time consuming, and expensive, thus adding significantly to the maintenance costs of the locomotive equipment. The need to tap into the main reservoir line and connect the tap line with the added male adapter requires additional plumbing skills and supplies. Further aggravating the inconvenience and expense is the inaccessibility of the pressure switches, which are typically located within the locomotive on the air brake manifold.

It is the primary object of the present invention to provide an improved checking device for the pressure switches of locomotives in order to reduce the difficulty and labor costs associated with testing the switches.

Another object of the invention is to provide a checking device of the character described which presents, at a single accessible location, convenient connections for both the electrical and air pressure testing equipment. In accordance with the invention, each bank of switches has its own test panel that includes a pair of plug in type electrical receptacles for each switch, accompanied by a nearby quick connect coupling for the air test hose. Accordingly, an ohmmeter can be quickly and easily connected across the receptacles, and the test hose can be readily connected to and disconnected from the air line coupling, thereby eliminating the time, difficulty and expense involved in dismantling and reassembling the pressure switches as has been necessary in the past.

A further object of the invention is to provide, in a checking device of the character described, a quick connect coupling on the test panel which supplies pressure from the main air reservoir of the brake system. This feature of the invention is important in that the test hose can simply be connected at one end with the main reservoir coupling on the test panel and at the other end with the coupling for the pressure switch that is to be checked. This eliminates the cumbersome prior art technique of tapping into the main reservoir line and connecting the tap line successively to each pressure switch adapter.

An additional object of the invention is to provide a checking device of the character described which is simple and economical to construct and install, and which minimizes the amount of plumbing and electrical wiring.

Other and further objects of the invention, together with the features of novelty appurtenant thereto, will appear in the course of the following description.

DETAILED DESCRIPTION OF THE INVENTION

In the accompanying drawing which forms a part of the specification and is to be read in conjunction therewith and in which like reference numerals are used to indicate like parts in the various views:

FIG. 1 is a front elevational view of the central test panel included in a pressure switch checking device constructed according to the present invention;

FIG. 2 is an electrical schematic illustrating the manner in which the checking device is wired in relation to the pressure switch circuits; and FIG. 3 is a schematic diagram illustrating the air connections between the checking device and the air lines of the pressure switches.

Referring now to the drawing in detail and initially to FIG. 3, the device of the present invention is used to check a series of pressure sensitive switches which are designated by numerals 10, 12, 14 and 16. These switches are included in the pneumatic brake systems of many locomotives and serve a variety of functions, usually with respect to correlating the operation of remote or slave units with lead or master locomotives. The switches are mounted on the locomotive's air brake manifold (not shown) and are thus difficult to gain access to in order to test them for proper operation.

Switches 10–16 connect respectively with air lines 18, 20, 22 and 24 which transmit to the switches the pressure at various portions of the brake system or at various components thereof. By way of example, the air line 18 associated with switch 10 may lead to connection with a common brake line (not shown) extending between the brakes of a master locomotive and those of the remote unit. If an angle cock (not shown) included in the brake line should inadvertently close, the braking power to the remote unit will be shut off. To signal such a condition, or another emergency situation such as a break in one of the air lines, air is admitted to line 18 from the main reservoir and the pressure is transmitted to switch 10. When the pressure applied to switch 10 exceeds a preselected level, its normally open switch contact 10a (FIG. 2) closes, thereby completing a normally broken electrical circuit that includes conductors 26 and 28, along with a signal device or the like (not shown) to which conductors 26 and 28 lead. When this circuit is completed, logic circuitry (not shown) connects the signal device and sends a command signal to additional logic circuitry on the remote unit such that emergency application is initiated at both the remote and master units.

Similarly, the air lines 22 and 24 transmit the pressure from other portions of the braking system, and switch contacts 14a and 16a of switches 14 and 16 close when the pressure applied thereto exceeds a preset level. Closing of contact 14a completes a normally broken circuit that includes conductors 38 and 40 and a signal device (not shown). Closing of contact 16a likewise closes a normally broken circuit that includes conductors 34 and 36 and another signal device (also not shown). Switch 12 has a normally closed contact 12a which opens when the pressure applied to line 20 is above a preselected level, with the open switch contact then breaking a normally completed circuit that includes conductors 30 and 32. Breaking of this circuit provides a suitable output such as a visual or audible signal.

It is to be understood that the pressure switches may be arranged in banks having any number of switches (usually 4 or 5 per bank), and that the switches may be located on the lead locomotive, on a remote locomotive, or in some cases on a remote railroad car. Further, the air lines 18–24 may act to transmit the air pressure from any desired portion of the braking system.

The present invention provides a convenient means for determining whether or not the switch contacts open and close properly in response to application of pressure to the switches 10–16. In accordance with the invention, a single flat test panel 42 is provided for each bank of switches. As best shown in FIG. 1, panel 42 is a thin rectangular plate member which may be mounted at any convenient location that is readily accessible when testing of the switches is to be undertaken.

With reference again to FIG. 3, an air line 44 taps into line 18 at one end and connects at the opposite end with a conventional quick connect coupling 46. In a similar matter, air lines 48, 50 and 52 tap into the respective pressure lines 20, 22 and 24 and lead to connection with quick connect couplings 54, 56 and 58, respectively. As best shown in FIG. 1, couplings 46, 54, 56 and 58, are mounted in a horizontal row on panel 42 in projection from the flat front surface thereof and in proximity to one another.

The braking system of the locomotive includes a main reservoir 60 (FIG. 3) which provides air under pressure to a main air line 62 that leads to the various portions of the braking system. The present invention includes an air line 64 which taps into line 62 at one end and connects at the opposite end with a quick connect coupling 66 mounted on the front face of panel 42 at a location to the side of coupling 58 (see FIG. 1).

Each of the quick connect couplings on the panel 42 is of a well known type having a normally closed check valve (not shown) which opens automatically when a mating coupling is attached. The mating coupling may be quickly connected to provide an air tight flow path, and it may be quickly disconnected to break the flow path and result in automatic closing of the check valve.

The present invention further provides electrical wiring which bypasses each switch contact in order to facilitate testing of the switches. With reference to FIG. 2, electrical conductors 68 and 70 connect with conductors 26 and 28, respectively on opposite sides of switch contact 10a. Conductors 68 and 70 lead to connection with respective plug in type sockets or receptacles 72 and 74 which are located on the front face of panel 42 above one another (see FIG. 1).

In a similar fashion, conductors 76 and 78 connect on opposite sides of switch contact 12a with conductors 30 and 32, respectively, and lead to connection at their opposite ends with respective receptacles 80 and 82 located one above the other on panel 42. Another pair of conductors 84 and 86 extend from the respective conductors 38 and 40 to connection with respective receptacles 88 and 90 on panel 42. Switch contact 16a is likewise bypassed by conductors 92 and 94 which connect with conductors 34 and 36 and with receptacles 96 and 98 located on panel 42.

Each of the receptacles on panel 42 is a conventional type of electrical terminal into which a mating jack (not shown) may be plugged in order to make electrical contact with the receptacle. Preferably, the receptacles in each pair are color coded to insure that the jack will be plugged into the proper receptacles. It is pointed out that each pair of receptacles is located in close proximity to the corresponding quick connect coupling.

The front surface of panel 42 is provided with labels that indicate the particular pressure switch that is associated with each air coupling and each pair of receptacles. Thus, label 100 is marked "P8" to indicate that coupling 46 and the associated receptacles 72 and 74 are for testing of the P8 pressure switch 10. Labels 102, 104, and 106 are similarly marked "P1", "P2" and "P3", respectively. Label 108 is marked "MR" to indicate that coupling 66 connects with the main reservoir 60.

The test panel 42 may be used to test or check each pressure switch 10–16 in order to determine that it is operating properly when subjected to a preselected test pressure. Since each switch is checked in a similar manner, only the procedure involved in checking switch 10 will be described in detail, it being understood that the other switches may be checked by essentially the same process.

Checking of switch 10 is accomplished by connecting an ohmmeter or a similar testing device (not shown) across the terminals provided by the receptacles 72 and 74. A test air hose that includes a pressure gauge and reducing valve (not shown) is then connected between couplings 46 and 66. This may be easily done by connecting quick connect couplings on the opposite ends of the test hose with couplings 46 and 66. The reducing valve is then adjusted until the test pressure, as indicated on the gauge, is at the level at which switch 10 is intended to close. The air pressure is applied from reservoir 60 through lines 62 and 64, through the test hose from coupling 66 to coupling 46, and at the test pressure to switch 10 through lines 44 and 18. If the switch contact 10a closes as it should, the ohmmeter will so indicate, since closing of the contact greatly reduces the resistance measured by the ohmmeter. However, if contact 10a does not close, there will be no significant change in the ohmmeter reading, indicating that switch 10 is not operating properly. The switch may be adjusted until contact 10a closes at the test pressure, thus restoring the switch to proper operating condition.

The remaining switches 12–16 are checked in much the same manner, although different test pressures may be applied to each switch since the switches are intended to open and close at different pressure levels.

The location of the air couplings and receptacles for each pressure switch close to one another on the readily accessible test panel 42 permits the pressure switches to be quickly and easily checked for proper operation.

Also, both the air connections and electrical connections can be made by means of standard couplings and jacks with little chance for error. Moreover, the present invention avoids the complicated, expensive and time consuming procedure required by the existing pressure switch checking technique, which involves taking off of the switch cover plate in order to gain access to the switch terminals, makeshift electrical connection of the ohmmeter to the switch terminals, removal of the fitting for the air line leading to the switch, mounting of the male adapter, tapping into the main reservoir line, connection of a test hose between the main reservoir line and the adapter, and reversal of these steps after completion of the test.

From the foregoing, it will be seen that this invention is one well adapted to attain all the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawing is to be interpreted as illustrative and not in a limiting sense.

Having thus described the invention, I claim:

1. A device for use in the testing of a pressure switch coupled with the pneumatic brake system of a railroad car through a first air line and having a switch contact which is included in an electric circuit and which opens and closes responsive to variations in the pressure applied to the switch, said device comprising:

a second air line disposed in communication with the pressure switch and terminating in a line ending coupling adapted for connection with a source of pressurized air, said second air line being normally closed to the passage of air while accommodating air flow when connected with said source, whereby a test pressure applied by said source may be transmitted to the pressure switch;

a pair of electrical conductors coupled with the electric circuit on opposite sides of the switch contact and terminating in respective circuit ending terminals said terminals being normally unconnected with other circuitry and adapted for connection with electrical testing equipment to cooperate therewith in a manner to detect opening and closing of the switch contact; and means mounting said coupling and terminals in proximity to one another.

2. A device as set forth in claim 1, wherein said mounting means includes a test panel on which said coupling and terminals are mounted in close proximity to one another.

3. A device as set forth in claim 1, including:

a second coupling communicating with said air source, whereby the first mentioned coupling and said second coupling may be disposed in communication with one another to transmit the test pressure to the switch; and means mounting said second coupling in proximity to the first mentioned coupling.

4. A device as set forth in claim 1, including a pressure line leading between a portion of the brake system and the pressure switch to transmit pressure therebetween, said second air line connecting with said pressure line at the end of the second air line opposite said coupling.

5. A device as set forth in claim 1, wherein said coupling comprises a check valve for closing said air line, said check valve being adapted to open in response to said coupling being joined with a mating coupling.

* * * * *